Figure 1:
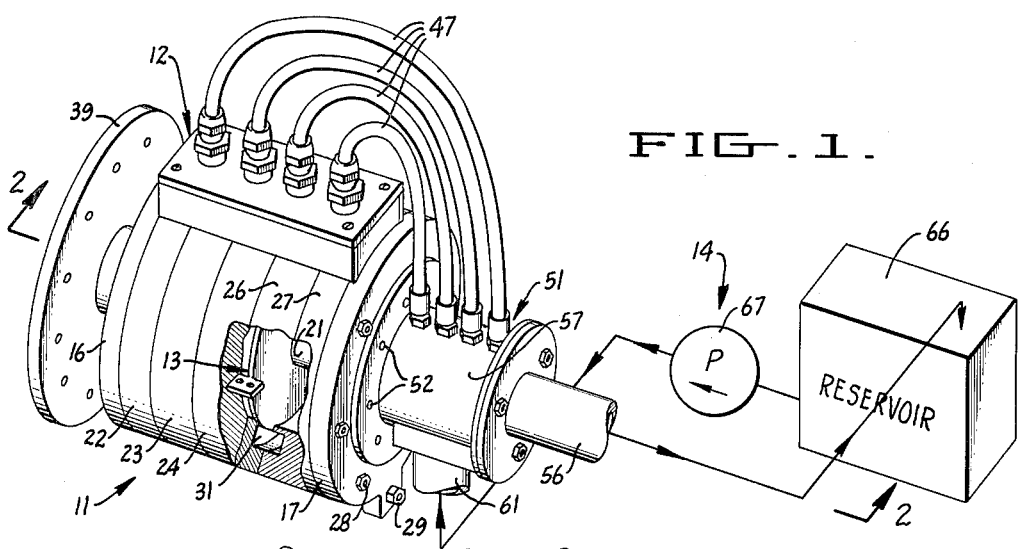

April 19, 1966 W. ZEEVELD 3,246,573
FLUID DRIVEN MOTOR
Filed Jan. 23, 1964 2 Sheets-Sheet 1

INVENTOR.
WILLIAM ZEEVELD
BY Schapp & Hatch
ATTORNEYS

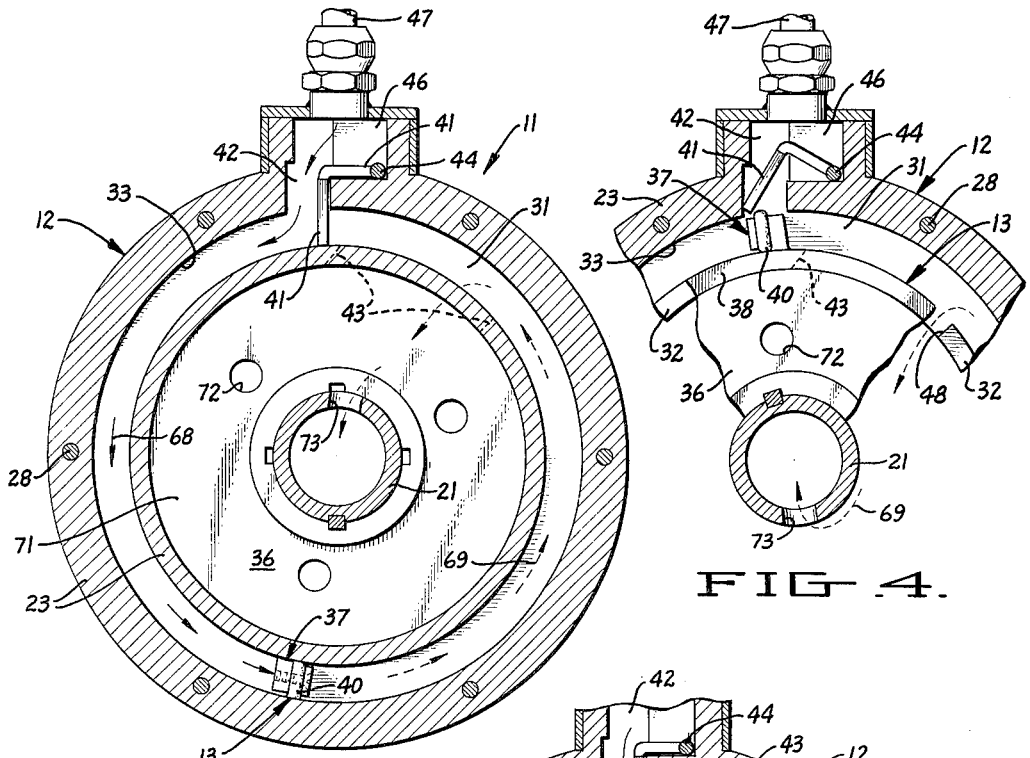
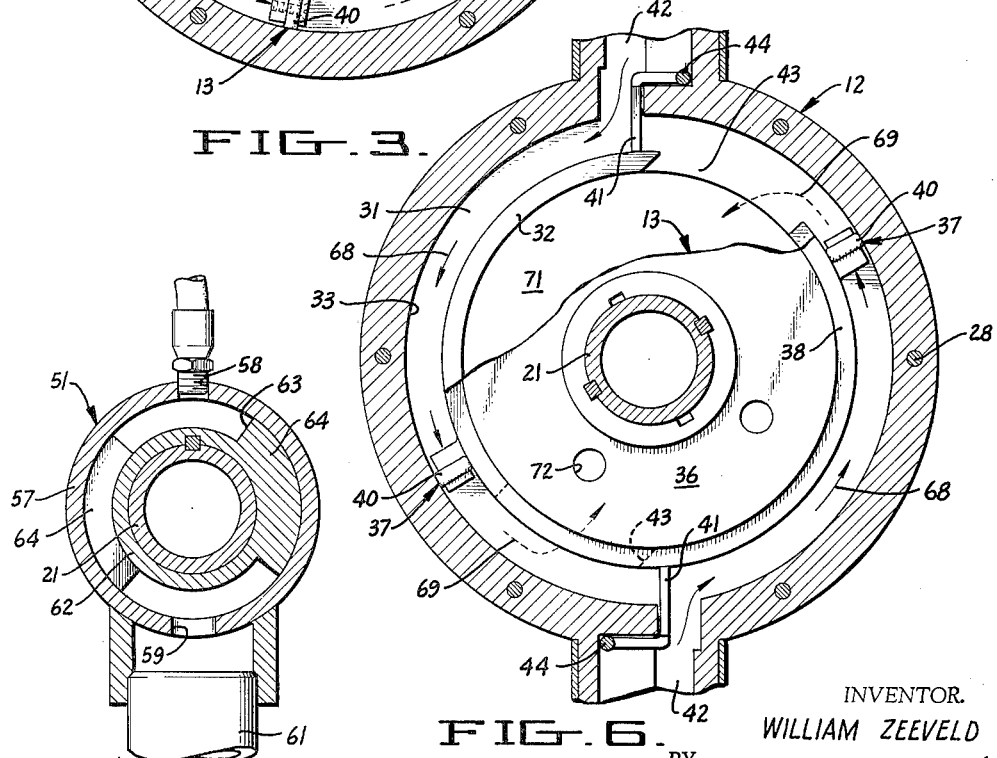

United States Patent Office 3,246,573
Patented Apr. 19, 1966

3,246,573
FLUID DRIVEN MOTOR
William Zeeveld, 1005 S. Jackson St., Red Bluff, Calif.
Filed Jan. 23, 1964, Ser. No. 339,693
5 Claims. (Cl. 91—117)

The present invention relates to improvements in a fluid driven motor and more particularly to an improved hydraulic motor capable of developing a continuous torque and a high power output with respect to the overall size of the motor.

Many different types of hydraulic motors have been developed and their uses are well known. For example, hydraulic motors are utilized to carry power through a fluid line and thereby transmit power from a power source to a portable machine at a distance. In addition, such motors have been utilized to provide other power transmission systems such as for effecting speed changes. It is contemplated that the improved motor of the present invention may be utilized in any of the prior known settings for hydraulic motors, and that the present motor is particularly useful where excellent efficiency and light weight is desired.

In general, a hydraulic motor may be considered as being a machine which is the theoretical opposite to a pump. In other words, energy of moving fluid under pressure is transformed back to mechanically energy. Thus, theoretically, any pump operating in reverse could serve as a hydraulic motor. However, as in pumps, hydraulic motors require special designs to avoid pusations and to provide an extremely smooth flow unless means such as a heavy fly wheel are provided to smooth over these pulsations. In addition, it is difficult to obtain the full torque of fluid pressure available without encountering this pulsation problem. In the present invention, a design is provided which not only takes the direct fluid pressure from the fluid line and applies it to a shaft, but also in its preferred form, the motor is designed to avoid problems of pulsation and can maintain a substantially continuous shaft torque.

Accordingly, it is a primary object of this invention to provide a hydraulic motor which is capable of delivering a large power output in comparison to the size of the motor.

Another object of the invention is to provide a hydraulic motor of the character described which has a positive pressure drive maintained on a rotor at all times by virtue of a special valving system.

A further object of the invention is to provide a hydraulic motor of the character described utilizing simple fluid line systems which are substantially free of unwanted leakage or power loss in the moving parts.

Still another object of the invention is the provision of a hydraulic motor of the character described which is simple in construction and absolutely reliable in operation.

Further objects and advantages of the invention will be apparent as the specification progresses, and the new and useful features of the fluid-driven motor will be fully defined in the claims attached hereto.

Figure 2:
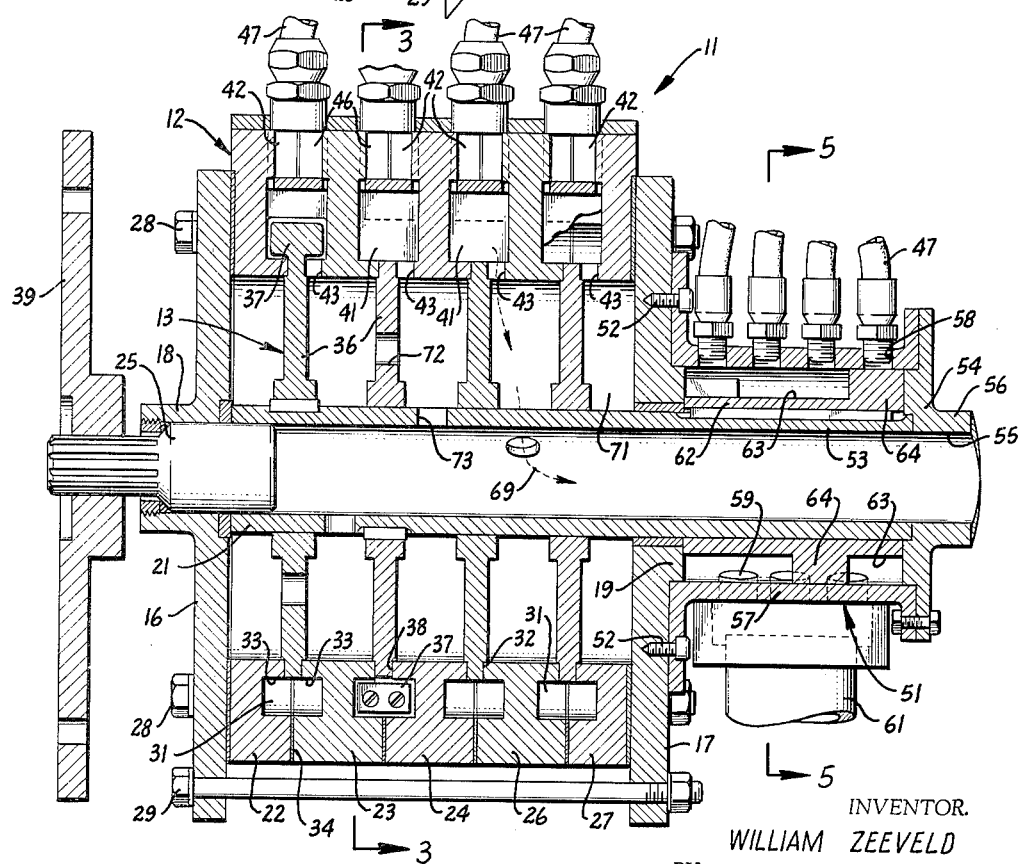

The preferred forms of the invention are illustrated in the accompanying drawings forming parts of this description, in which:

FIGURE 1 is a perspective view of a typical hydraulic motor constructed according to the invention;

FIGURE 2, a sectional view taken substantially in the plane of line 2—2 of FIGURE 1;

FIGURE 3, a sectional view taken substantially in the plane of line 3—3 of FIGURE 2;

FIGURE 4, an enlarged fragmentary view of a portion of the motor as seen in FIGURE 3 illustrating a different valve position from that shown in FIGURE 3;

FIGURE 5, a sectional view taken substantially in the plane of line 5—5 of FIGURE 2; and FIGURE 6, a sectional view similar to that shown in FIGURE 3, but illustrating an alternative construction that may be embodied in the hydraulic motor of the present invention.

While only the preferred forms of the invention are shown, it should be understood that various changes or modifications may be made within the scope of the claims attached hereto without departing from the spirit of the invention.

Referring to the drawings in greater detail and particularly to FIGURE 1, there is shown a hydraulic motor 11 comprising a stator 12, rotor 13 and means 14 for supplying hydraulic fluid under pressure to the motor. As best seen in FIGURE 2, the stator here illustrated is constructed from a pair of disc shaped plates 16 and 17 having central openings or hub sections 18 and 19 through which a shaft 21 is journaled. The stator also carries a plurality of ring shaped members 22, 23, 24, 26 and 27 which are assembled between the plates 16 and 17 and bolted through their periphery by means of bolts 28. The entire stator unit is fastened to any suitable frame work or supporting structure by means of bolt 29 or any other suitable fastening means.

As best seen in FIGURES 1 and 2, the stator contains walls defining at least one and preferably a plurality of annular chambers 31, each of which has an open ring-like section 32 on the inner portion thereof, and the open section is adapted to receive complementary parts of the rotor. Preferably, there is a plurality of chambers 31 such as the four chambers shown in FIGURES 1 and 2, and these chambers are formed by cutaway grooves in adjacent rings. Thus end rings 22 and 27 have grooves 33 on one side thereof and the inner rings 23, 24 and 26 have a pair of annular grooves 33 on both sides thereof. When the rings are assembled as shown, the grooves are placed in face to face relation to complete the chambers 31 as illustrated. In order to provide an efficient seal between rings, suitable sealing compounds or gaskets 34 are provided between rings.

The rotor 13 includes the shaft 21 and one or more ring shaped discs 36 suitably keyed to the shaft for rotation therewith. Each disc 36 contains a paddle shaped impeller 37 mounted on the peripheral rim 38 of the disc, the rim 38 being formed to have a wall complementary to the stator walls and completely close the annular chamber. The impeller is constructed to substantially fill a cross-section of the chamber 31, and preferably contains a sealing member 40 to provide a leak-proof fit.

The number of discs 36 should correspond to the number of chambers 31 and preferably the impellers 37 are staggered with respect to each other or otherwise constructed so that the impellers of the adjacent discs pass the means for supplying fluid under pressure to the annular chamber at different times. Shaft 21 is preferably hollow throughout a sufficient portion thereof to carry away hydraulic fluid, and has its opposite end section 25 solid or closed. Shaft 21 transfers power to a fly wheel 39 suitably mounted on the shaft end or any other power take-off structure desired.

From the foregoing description, it is seen that the impeller 37 rides in circular fashion in the chambers 31 of the stator, and the energy is provided to the motor by the supply of hydraulic fluid under pressure behind this impeller. In order to provide a positive pressure on the pressure side of the impellers, it is important to provide a barrier in the chamber behind the impeller such as is provided by valve 41. It is important that the valve member be mounted for movement into the chamber to provide a sufficient closure therein to prevent hydraulic fluid from flowing in the wrong direction, yet the valve member must be movable out of the chamber to allow movement of the impeller therepast.

It is also necessary to provide hydraulic fluid to the chamber and to remove spent hydraulic fluid from the chamber. Thus each chamber is provided with an intake port 42 and an outlet port 43 preferably located in adjacent positions through the stator with the valve 41 being disposed therebetween. As best seen in FIGURES 3 and 4, the valve 41 is preferably a flipping gate which is pivotally attached as at 44 so that it may swing out of the chamber 31 and allow impeller 37 to go past. In order to provide the maximum closeness of proximity to the intake port 42, the valve 41 is preferably mounted therein and the port 42 has a chamber 46 associated therewith to receive the valve 41.

In operation, the valve 41 is actually moved by fluid pressure so that there is no contact of the impeller element 37 against the valve. In other words, as the impeller 37 approaches the valve 41, a portion of hydraulic fluid in front of the impeller member and between the impeller and the end of the outlet port 43 will remain and act as a cushion between the two elements as the valve is pushed open. By the same token, when the impeller 37 has passed the inlet port 42, hydraulic fluid is again supplied to the inlet port through inlet line 47 and this incoming hydraulic fluid pushes the valve 41 back into the position shown in FIGURE 3. In order to facilitate this operation, the gate should have a sufficient width to substantially block chamber 46.

In order to provide the desired functioning of the valve and to prevent loss of power, suitable means is provided to shut-off the supply of hydraulic fluid through line 47 during the time period beginning when the impeller reaches the beginning section of the outlet port 43 at 48 and ending when the impeller 37 reaches the position shown in FIGURE 4 where clearance of the valve 41 is positively assured. In this way, the fluid supply is shut-off when there is no barrier between the inlet port and outlet port to avoid waste flow. There is also no pressure resistance to the opening of valve 41.

Since the rotor impeller is not powered for a positive fraction of arc of its rotation, it is preferred to utilize a plurality of impellers in associated chambers in the stator such as the four chambers here shown. With such an arrangement, it is possible to provide a substantially constant torque force on the rotor at all times because the closing of the valves are overlapped so that three of the four rotors are in driving position at all times. The overlapping effect may be provided by staggering the inlet ports around the stator or by staggering the impeller means on the rotor, or both. As here shown, the inlet ports are aligned and the impellers are staggered around the rotor. In any case, it is important that the shut-off means be synchronized with the movement of the impeller past the outlet and inlet as explained above, and preferably, the synchronization is positively assured by driving the shut-off means with the rotor shaft.

As here shown, the shut-off means for each of the four inlet lines 47 is in the form of a manifold 51 suitably bolted to plate 17 of the stator by means of bolts 52 and constructed to carry the rotating end 53 of shaft 21 therein. The manifold has a fixed end 54 which contains an opening 55 in alignment with the opening in end 53 of shaft 21 so as to provide a main outlet pipe 56. This main outlet pipe or fixed end is suitably bolted to a casing 57 of manifold 51. The casing is substantially sleeve-shaped and has openings 58 in communication with inlet lines 47 and openings 59 in communication with a main inlet pipe 61. Fitting between this casing 57, and the end 53 of shaft 21, is a distributor 62 which is keyed to the end 53 of shaft 21 and rotates therewith.

This distributor contains passages 63 which are continuously in communication with at least some of the openings 59 of main inlet pipe 61 so that a continuous supply of incoming fluid is available in these passages. The outlet of the chamber is normally open to the openings 58 in inlet lines 47, but when the impeller section of the corresponding rotor is in the position where the supply is to be cut-off as indicated above, block 64 of the distributor passes the proper inlet opening 58 to serve as a shut-off valve during the desired period of rotation. As here shown, these blocks are constructed to cover about 90° of arc and therefore, the shut-off position is about a 90° arm or ¼ of the rotation of the rotor. Thus, one of the blocks will be in front of one of the openings at all times, and three of the supply lines will be open. Thus three of the impellers will be constantly under power and one of the impellers will be constantly in an idling condition during the operation of the rotor.

In operation, the fluid is delivered from a suitable supply reservoir 66 by pump 67 through main inlet pipe 61 to the manifold 51, the fluid then passes through the distributor 62 and through the appropriate inlet lines 47 to the chamber 46 and intake ports 42 of the stator. The fluid then passes into the chambers 31 and forces the rotor around in the direction indicated by arrows 68. These forces correspond to the pressure of hydraulic fluid against the impeller and the size thereof as will be appreciated by those skilled in the art. The hydraulic motor is preferably kept completely full of fluid at all times, and the fluid from the previous power stroke will be in front of the impeller and moved to exhaust as indicated by arrows 69.

This fluid passes through outlet port 43 of the stator into a receiving chamber 71 which is located between the stator and shaft 21 as best shown in FIGURE 2. This receiving chamber actually consists of a series of annular chambers separated by the disc shaped element 36 of the rotor, but communication between chambers is provided by means of holes 72 in the discs 36 to provide free flow of fluid at all times between various parts of the chamber. From the receiving chamber 71, the fluid passes inside the shaft 21 through holes 73 which are spaced in convenient locations to communicate between chambers 71 and the inside of the shaft 21. From the hollow shaft, the fluid goes to main outlet pipe 56 and from there back to the reservoir 66.

From the foregoing discussion, it is seen that I have provided an improved hydraulic motor which is capable of efficient torque transmission with a simple structure. It is also seen, that my motor is capable of a high power output as well as a positive torque with a comparatively small unit.

As indicated above, the specific construction of the motor may be varied by providing any number of rotor discs, as desired. It will also be appreciated by those skilled in the art, that various modifications may be provided such as controls in the inlet lines 47 to change the power ratio of the motor with respect to the pump output. Thus, the basic structure should be limited only by the appended claims and not by variations of structures within the motor or control elements associated therewith.

In addition to the seize and number of rotor elements, it is also possible to change the construction of each of the rotor discs in their associated stator chambers to provide two or more impellers on each rotor disc. Thus, as shown in FIGURE 6, there is provided a rotor disc similar to that shown in FIGURES 1 through 5 fitting in conforming fashion within a chamber of a similar stator member. The difference between FIGURE 6 and that shown in FIGURES 1 through 5 resides in the two impellers on the rotor disc, and in two sets of inlet ports, outlet ports, and valve 41. In addition, the distributor of the manifold will also contain two blocks 64 (not shown) to synchronize the inlet supply in equivalent manner to the supply of the embodiment of FIGURES 1 through 5.

The advantage of the structure of FIGURE 6 resides in a greater power to weight ratio because each rotor disc provides twice the torque as compared to those in the embodiment of FIGURES 1 through 5 during the power period of the stroke when the same hydraulic pressure is maintained with equal sized rotor discs. This double torque is somewhat offset by the increased period of dwell or when the impeller is passing the outlet or exhaust port and associated valve. However, the gain exceeds the loss in the illustrations here shown so that ⅓ more power can be delivered by the same motor.

The optimum number of impellers per rotor disc will depend upon the size of the exhaust ports and other design factors, and it is believed that three or even four impellers per rotor disc might be desirable in certain cases. Although the motor is described specifically as a hydraulic motor, it is contemplated that the motor might be operated from any fluid under pressure such as steam and the invention is not to be limited by the particular fluid supply system used.

From the above description it is seen that my hydraulic motor has the advantage of providing a power stroke and an exhaust stroke simultaneously on each side of a rotor impeller. It is also seen that the stroke is provided on impellers moving in a circular path to achieve a constant shaft torque.

I claim:

1. A hydraulic motor comprising a stator having walls defining an annular chamber open on the inside portion thereof, a rotor mounted for rotation in said stator and having a wall complementary to the opening in the stator chamber to provide a closure for the annular chamber, a shaft in operative attachment with said rotor for transmitting power to the outside of the motor, an impeller on said rotor fitting into said annular chamber and substantially filling the cross-section thereof, an inlet port on said stator communicating to said chamber, a valve member mounted on said stator for movement into said annular chamber to provide a barrier therein and movable out of said chamber to allow movement of the impeller therepast, said valve member being mounted in a position adjacent to said inlet port, synchronized shut-off means for shutting off the liquid supply to the inlet when said impeller approaches and passes said valve member, said synchronized shut-off means including a rotary valve mechanism mounted on the shaft for synchronized operation with respect to the shaft and the rotor, and pump means for supplying liquid under pressure to said inlet port.

2. A hydraulic motor comprising a stator having walls defining an annular chamber open on the inside portion thereof, a rotor mounted for rotation in said stator and having a wall complementary to the opening in the stator chamber to provide a closure for the annular chamber, an impeller on said rotor fitting into said annular chamber and substantially filling the cross-section thereof, an inlet port on said stator communicating to said chamber, an outlet port communicating to said chamber at a position laterally disposed to said inlet port, said rotor having a hollow shaft communicating to the outside of the motor, passage means between said outlet port and said hollow shaft, a valve member mounted on said stator for movement into said annular chamber to provide a barrier therein and movable out of said chamber to allow movement of the impeller therepast, said valve member being mounted to provide a closed position between said inlet port and said outlet port, synchronized shut-off means for shutting off the liquid supply to the inlet while the impeller passes both the outlet port and the inlet port, said synchronized shut-off means including a rotary valve mechanism mounted on the shaft for synchronized operation with respect to the shaft and rotor, and pump means for supplying liquid under pressure to said inlet port.

3. A hydraulic motor comprising a stator having walls defining an annular chamber open on the inside portion thereof, a rotor mounted for rotation in said stator and having a wall complementary to the opening in the stator chamber to provide a closure for the annular chamber, an impeller on said rotor fitting into said annular chamber and substantially filling the cross-section thereof, an inlet port on said stator communicating to said chamber, an outlet port communicating to said chamber at a position laterally disposed to said inlet port, said rotor having a hollow shaft communicating to the outside of the motor, passage means between said outlet port and said hollow shaft, a valve member pivotally mounted at the inlet port for swinging movement into and out of said annular chamber, a valve member receiving chamber at said inlet port to receive the valve member when it swings out of said annular chamber, synchronized shut-off means for shutting off the liquid supply to the inlet while the impeller passes both the outlet port and the inlet port, said synchronized shut-off means including a rotary valve mechanism mounted on the shaft for synchronized operation with respect to the shaft and rotor, and pump means for supplying liquid under pressure to said inlet port.

4. The hydraulic motor defined in claim 3 in which the annular chamber has two inlet ports, two outlet ports and two valve members, and two impellers are provided on the rotor for said annular chamber.

5. A hydraulic motor comprising a sator having walls defining a plurality of annular chambers each having an opening on the inside thereof, a shaft rotatably mounted in the stator and having its central axis in alignment with the centers of the annular chambers, a rotor mounted on said shaft having a plurality of disc-shaped sections, each of said disc-shaped sections having a rim portion fitting into a stator channel to provide annular chambers, an impeller on each disc-shaped section fitting into the annular chamber, each of said annular chambers having an inlet port and an outlet port in laterally disposed position, a closed liquid supply system including an inlet line leading to each inlet port and an outlet line in liquid communication with the outlet ports, a pump in said liquid supply system for receiving liquid from the outlet line, and a synchronized shut-off means mounted on the shaft and containing a manifold and rotary valve mechanism for distributing liquid on the downstream side of the pump through said inlet lines, said rotary valve mechanism being formed with members operative to shut off each inlet line when the impeller in the annular chamber associated with the inlet line is between the inlet port and the outlet port.

References Cited by the Examiner

UNITED STATES PATENTS

| | | | |
|---|---|---|---|
| 512,883 | 1/1894 | Hoagland | 91—117 |
| 1,122,403 | 12/1914 | Lexa | 91—117 |
| 1,406,140 | 2/1922 | Anderson | 91—117 |
| 1,610,613 | 12/1926 | Lithander | 91—117 X |
| 1,616,333 | 2/1927 | Prince | 91—117 |
| 2,485,240 | 10/1949 | Jackson | 60—53 |

SAMUEL LEVINE, *Primary Examiner.*

A. S. ROSEN, *Assistant Examiner.*